US010865094B2

(12) United States Patent
Marcarino (10) Patent No.: US 10,865,094 B2
(45) Date of Patent: Dec. 15, 2020

(54) DROPPER MACHINE

(71) Applicant: SOREMARTEC S.A., Findel (LU)

(72) Inventor: Massimiliano Marcarino, Alba (IT)

(73) Assignee: SOREMARTEC S.A., Findel (LU)

( * ) Notice: Subject to any disclaimer, the term of this patent is extended or adjusted under 35 U.S.C. 154(b) by 73 days.

(21) Appl. No.: 16/007,444

(22) Filed: Jun. 13, 2018

(65) Prior Publication Data
US 2018/0362325 A1    Dec. 20, 2018

(30) Foreign Application Priority Data

Jun. 14, 2017   (LU) .................................... 100315

(51) Int. Cl.
| | | |
|---|---|---|
| A23G 1/20 | (2006.01) |
| A23G 3/20 | (2006.01) |
| A23G 3/02 | (2006.01) |
| B67D 3/00 | (2006.01) |
| G01F 11/02 | (2006.01) |
| G01F 11/00 | (2006.01) |

(52) U.S. Cl.
CPC ........... *B67D 3/0045* (2013.01); *A23G 1/206* (2013.01); *A23G 3/0257* (2013.01); *A23G 3/203* (2013.01); *B67D 3/0003* (2013.01); *B67D 3/009* (2013.01); *B67D 3/0074* (2013.01); *G01F 11/003* (2013.01); *G01F 11/023* (2013.01); *G01F 11/029* (2013.01)

(58) Field of Classification Search
CPC .... B67D 3/0045; A23G 1/206; A23G 3/0257; A23G 3/203
USPC .................. 141/83, 255, 266, 269, 270, 283
See application file for complete search history.

(56) References Cited

U.S. PATENT DOCUMENTS

| | | | | |
|---|---|---|---|---|
| 2,296,861 A | | 9/1942 | Matter | |
| 3,048,128 A | * | 8/1962 | Warren | ................. A23G 3/0257 |
| | | | | 426/233 |
| 4,538,978 A | * | 9/1985 | Cerboni | ................. A23G 1/206 |
| | | | | 425/206 |

(Continued)

FOREIGN PATENT DOCUMENTS

GB           784064 A       10/1957

OTHER PUBLICATIONS

Search Report and Written Opinion issued for Luxembourg Patent Application No. 100315 dated Mar. 8, 2018, 14 pages.

(Continued)

*Primary Examiner* — Michael R Reid
*Assistant Examiner* — Paul J Gray
(74) *Attorney, Agent, or Firm* — Rothwell, Figg, Ernst & Manbeck, P.C.

(57) ABSTRACT

A dropper machine for pouring a measured amount of a substance in a plurality of receptacles, including:
  a reservoir containing the substance to be dropped,
  cylinder and piston metering devices,
  a drive unit arranged to simultaneously drive the piston of the metering devices wherein each of the metering devices is associated with a respective actuating device cooperating with the piston of the metering device, the actuator device being operable individually to inhibit the delivery of the substance to be dropped through the nozzle when the drive unit is actuated to cause displacement of the pistons of the metering devices associated therewith between the start position and the end position.

10 Claims, 5 Drawing Sheets

(56) References Cited

U.S. PATENT DOCUMENTS

| | | |
|---|---|---|
| 4,787,534 A | 11/1988 | Cillario |
| 5,087,464 A | 2/1992 | Eberhardt et al. |
| 2004/0253148 A1 | 12/2004 | Leaton |
| 2010/0147419 A1 | 6/2010 | Balnoschan et al. |

OTHER PUBLICATIONS

Martin J. Bond et al.; "Depositing—The Future of Hard Candy"; Jun. 29, 2016; Retrieved from the Internet: http://fliphtml5.com/qjfd/qhdd/basic [retrieved on Mar. 5, 2018].
S. V. Maffizoni; "Food Processing—Beverage & Packaging Special"; Jun. 1, 2016; Retrieved from the Internet: http://www.editricezeus.net/archivio/FP/FP16_6.pdf [retrieved on Mar. 5, 2018].

\* cited by examiner

DROPPER MACHINE

CROSS REFERENCE TO RELATED APPLICATION

This application claims the benefit of Luxembourg Patent Application No. 100315 filed on Jun. 14, 2017, the disclosure of which is incorporated by reference in its entirety.

The present invention relates to a dropper or dosing machine and to a system comprising it, of the type used to deliver a measured amount of a substance in the fluid state into a receptacle (i.e. in a product in the process of formation).

Such dropper machines are widely used, particularly in the food industry, for various purposes, such as filling shells or valves of foodstuffs such as wafer or chocolate, the introduction of an inner filling in a bakery product or the like, or the filling of molds wherein the substance delivered in a fluid state is intended to solidify, forming a shaped product.

The term 'receptacle', used in this description, generally comprises food and non-food receptacles that are intended to receive, either in their interior or also on their outer surface, a measured quantity of the fluid substance mentioned above; however, the preferred embodiment of the invention and the one that draws greater advantages from the features of the dropper machine which is object of the invention is the one wherein the receptacles are shells or half-shells of foodstuffs obtained in a previous molding operation in the production line of a finished product wherein the dropper machine is inserted.

The term 'fluid' comprises substances or mixtures of flowable substances, such as liquids, including pasty or creamy liquids, regardless of their degree of viscosity; examples include lipid-based compositions (such as chocolate) and creamy compositions.

In general, a dropper machine of the aforementioned type comprises a support structure, a reservoir containing the material to be dropped, supported by said structure and a plurality of pump metering devices typically of a cylinder and piston type, generally arranged inside the reservoir, with an inlet positioned below the level of the fluid substance to be dropped and an outlet communicating with a respective dropper nozzle. The metering devices are simultaneously actuated by a drive group acting on the pistons of the metering devices, causing a forward and backward motion between two terminal positions, namely a start and end positions; the displacement of the piston from the end position to the start position causes the suction of the liquid to be metered from the reservoir to the cylinders of the metering devices and the displacement of the pistons from the start position to the end position is adapted to cause the fluid to be metered to be delivered through the respective nozzles.

A dropper machine of this type is, for example, described in U.S. Pat. No. 4,787,534.

The dropper machine is associated with a conveyor that sequentially conveys to the dropper machine the receptacles wherein the substance to be dropped is metered; in general, the conveyor is movable by steps with stop positions wherein the receptacles are aligned with the nozzles of the dropper machine, however, installations are also provided wherein the dropper machine is provided with a conveyor tracking motion so as to carry out the pouring in the absence of the relative motion.

In an industrial plant, the conveyor generally follows a predetermined path wherein a plurality of stations or devices are arranged, including the dropper machine, each of which may perform a particular operation for the production of a finished food product.

As has been said, in order to increase productivity, the substance is dropped into a plurality of receptacles generally housed in a plate or mold having cavities and arranged in a row transversely with respect to the conveyor's forward direction, or arranged in a matrix according to multiple rows and columns, and the dropper machine is equipped with a corresponding number of metering devices.

The object of the present invention is to provide an improved dropper machine which improves productivity by avoiding the production of defective finished products and/or by limiting or avoiding the stop times otherwise necessary to vary the spatial arrangement of the metering devices to suit the spatial arrangement, size, and nature of the receptacles when the dropper machine is used to prepare a different product.

In view of such object, the subject of the invention is a dropper machine having the features defined in the following claims, which form an integral and supplementary part of the present description.

In particular, the dropper machine object of the invention is able to avoid the production of defective products by inhibiting the delivery of the substance to be metered by one or more metering devices, the nozzles of which are arranged over a respective defective receptacle, for which the dropping of the substance would be an unnecessary waste. This feature is particularly important when the receptacles are made of wafer half-shells or similar baked goods or chocolate half-shells possibly produced on the same production line which includes the dropper machine, which may have surface defects, such as a mouth or opening with a crumbled rim that makes them unsuitable for continuing to the next stages of processing and wherein, therefore, dropping of the filling should be avoided.

In addition, the dropper machine allows the spatial arrangement of the nozzles of the active and inactive metering devices to be varied, in an automated way, thus allowing to quickly adapt the dropping configuration and the quantity of the product to be metered, without needing to stop the system, to different kinds of receptacles fed sequentially to the dropper machine.

Further advantages and features of the dropper machine according to the invention will become apparent from the detailed description that follows, made with reference to the accompanying drawings, provided by way of non-limiting example, wherein.

The example illustrated in the drawings refers to a dropper machine, indicated in its entirety at 2, operating on a production line for the industrial preparation of filled baked pastry products formed of two half-shells obtained by baking wafer batter or the like, coupled mouth-to-mouth and including a filling.

These half-shells are housed in corresponding seats of a dimpled plate P and fed by a conveyor T to the dropper machine 2. In subsequent processing stations, such half-shells, wherein the dropper machine has metered the food substance that constitutes the filling, are coupled, mouth-to-mouth to form the finished product.

Figure 1:
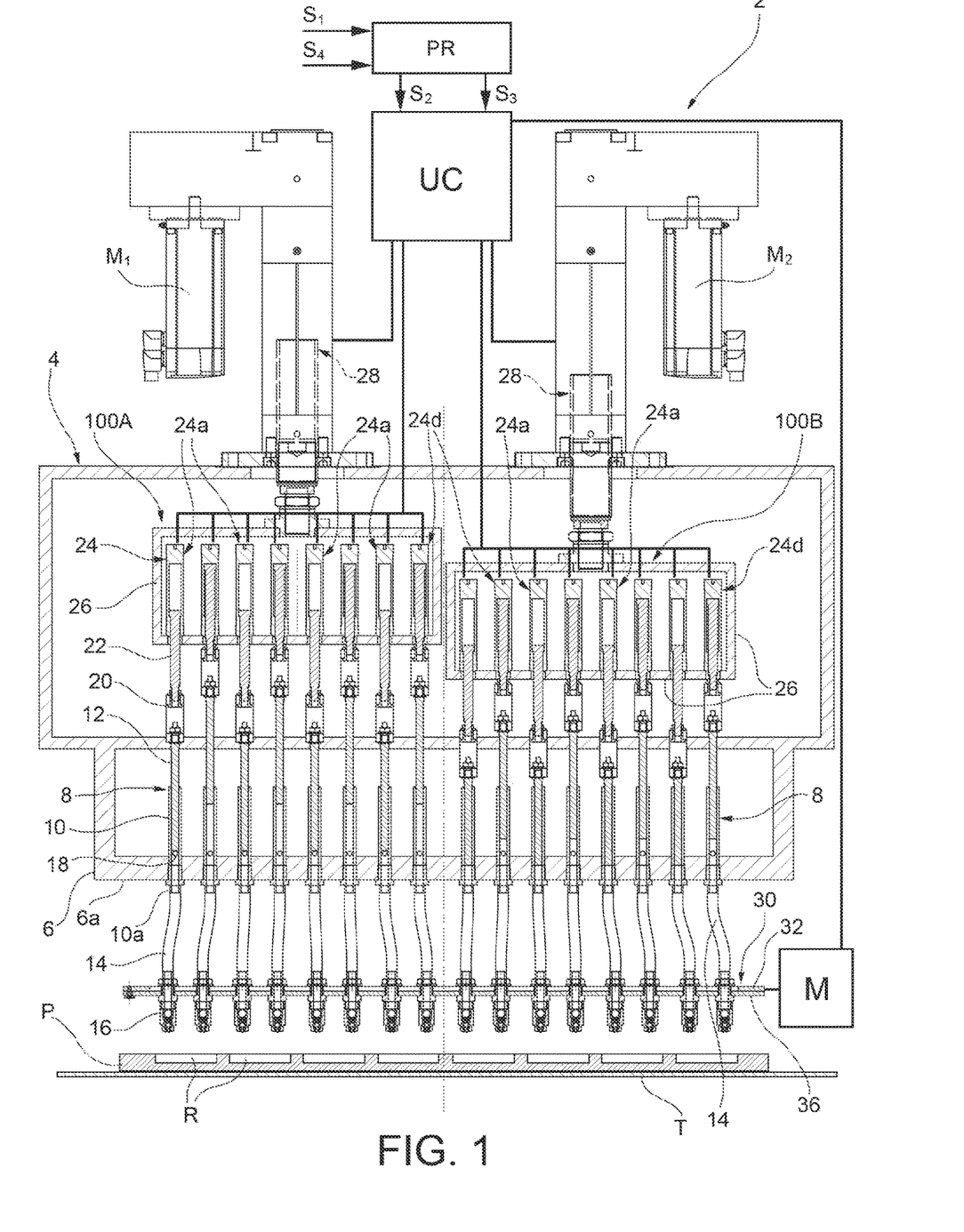
FIG. 1 is a partially sectioned front view of a dropper machine according to the invention.

The dropper machine 2 comprises a support structure 4 which is associated to a reservoir 6 for the substance to be poured, which is maintained in the fluid state.

The dropper machine comprises a plurality of metering devices 8 of the pump type comprising a cylinder 10 and a piston 12.

The cylinders 10 of each metering device, on a vertical axis, pass through the bottom wall 6a of the reservoir 6 and have an outlet opening 10a connected through a flexible duct 14 to a respective metering nozzle 16.

Each cylinder 10 has at least one inlet opening 18 which puts the inner cavity of the cylinder in communication with the fluid contained in the reservoir; such one or more openings are positioned in the cylinder at a level below the fluid level maintained in the reservoir.

Each piston 12 is connected by a coupling 20 to a rod 22 of an actuator device 24.

The actuators 24 are integral with a drive unit 100A (and 100B) comprising a framework 26 to which actuators 24, a motor M1 and a drive are fixed, in the described embodiment, said drive is a piston 28 and is connected to the framework 26. The motor M1, by means of the piston 28, causes the vertical translation of the framework 26 and the actuators 24 connected thereto, according to a forward and return motion, causing the fluid substance to be metered to flow through the nozzles 16.

In particular, the drive unit, which causes the translation of the framework 26 and the actuators 24 integral to it, is arranged to simultaneously actuate the pistons 12 of all the metering devices 8 connected to the respective rod 22 of the actuators 24 according to a forward and return motion between a start position and an end position. The displacement of the pistons in the ascending motion from the end position (lowered) to the start position (raised) causes the suction of the fluid to be metered from the reservoir 6 to the inside of the respective cylinder 10 through the openings 18. Subsequently, the displacement of the pistons in descending motion, from the start position (raised) to the end position (lowered), is adapted to cause the delivery of the fluid to be metered through the respective nozzles. In particular, in the aforementioned descending motion, the piston 12, which is slidably sealed in the respective cylinder 10, covers in its travel the inlet openings 18, thus avoiding the return of the fluid substance in the reservoir and causing the expulsion of an amount of fluid substance to be metered through nozzle 16.

In the representation of FIG. 1, two drive units 100A and 100B are illustrated, each having associated thereto eight metering devices arranged in a row. It is understood that several rows of metering devices may be associated with each drive unit.

A first drive unit 100A, shown on the left side of FIG. 1, is illustrated in the start position (raised), from which the descending movement which is adapted to cause the expulsion of the fluid substance to be metered through the nozzles. A second drive unit 100B is illustrated on the right side of FIG. 1 at an end position, wherefrom the ascending motion subsequently starts causing the suction of the fluid substance to be metered inside the cylinders 10. The second drive unit, similar to the first one, comprises in turn a motor M2, a piston always indicated at the reference number 28, and a respective framework 26.

The dropper machine according to the invention allows the configuration of the drop to be varied to adapt such configuration to the arrangement of the receptacles R in the respective support plate P, as well as to the shape features of the same receptacles.

This result is achieved by inhibiting the delivery of the fluid substance to be metered by one or more of the metering devices associated with a drive unit of the dropper. In particular, in the illustrated embodiment, such result is achieved by means of actuators 24 cooperating with the piston 12 of the respective metering device and which are adapted to be individually actuated to prevent the delivery of the fluid substance to be metered through the respective nozzle when the drive unit is actuated to cause the delivery, otherwise simultaneous, from all the measuring devices.

Actuators 24 may for example be pneumatic or electric actuators and each of them is electrically connected to a control unit UC which enables them to be activated or deactivated individually.

In the illustrated embodiment, the disabling of the delivery by a single metering device 8 is achieved by means of a command which sets the axial displacement of the rod 22 of the actuator 24 to a raised position; in this deactivation position, the axial displacement of the piston 12 connected to the rod 22 from the raised start position to the lowered end position caused by the drive unit, causes the ejection of the fluid substance to be delivered, contained in the cylinder 10, through the openings 18 inside the reservoir, since in its downward stroke the piston does not cover such openings.

The delivery is activated by moving the actuator rod 22 to the lowered position (extended); in this position of activation, the axial displacement of the piston 12 connected to the rod 22, from the raised start position to the lowered end position caused by the drive unit, causes the ejection of the fluid substance to be delivered through the nozzles 16, since in its downward travel the piston covers the openings 18.

In FIG. 1 at 24a are indicated some of the actuators which are in position to activate the delivery and wherein the rod 22 is consequently in a lowered position; at 24d are indicated some of the actuators in the deactivated position wherein the respective rod 22 is in the raised position.

In order to prevent the outflow by gravity of the fluid substance to be dropped contained in the ducts 14, when the delivery device is deactivated or in the suction step of said fluid within the respective cylinder, the nozzles 16 preferably have an obturator, for example of the ball type, with elastic contrast means, which keeps the nozzle in the closed position during such steps and allows the delivery when the pressure exerted by the pistons 12 overcomes the opposing force exerted by the elastic means on the ball.

In a preferred embodiment, the dropper machine according to the invention furthermore allows the spatial arrangement of the nozzles to vary according to a plurality of predefined configurations, in an automated way and without the need to stop the machine to change the positioning of the metering devices in the support structure wherein they are mounted.

Figure 3:
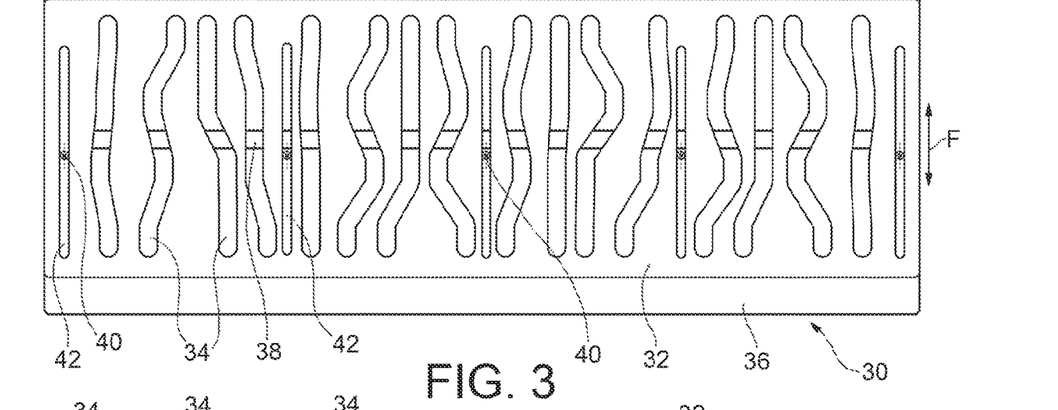
FIG. 3 is a plan view of a cam device that allows the interaxial distance between the nozzles of the metering devices to be adjusted, FIGS. 4 and 5 respectively illustrate a detail of the cam device in FIG. 3.
Figure 4:
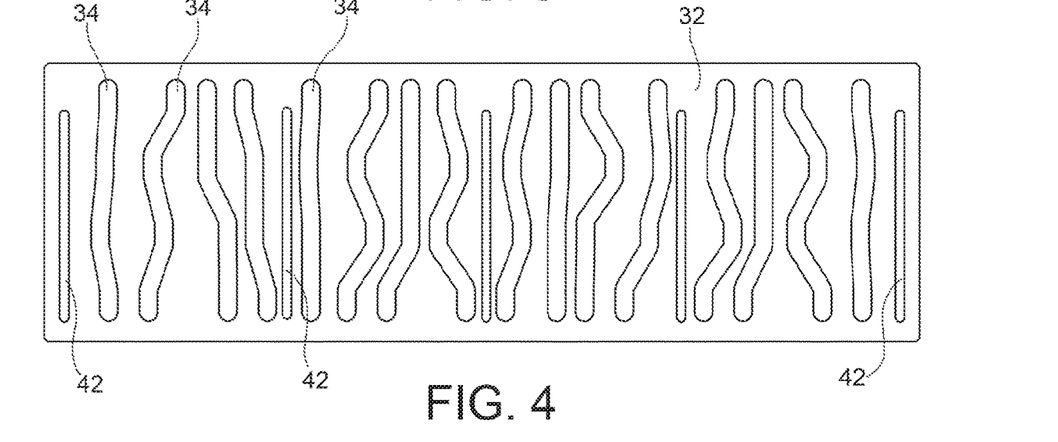
Figure 5:
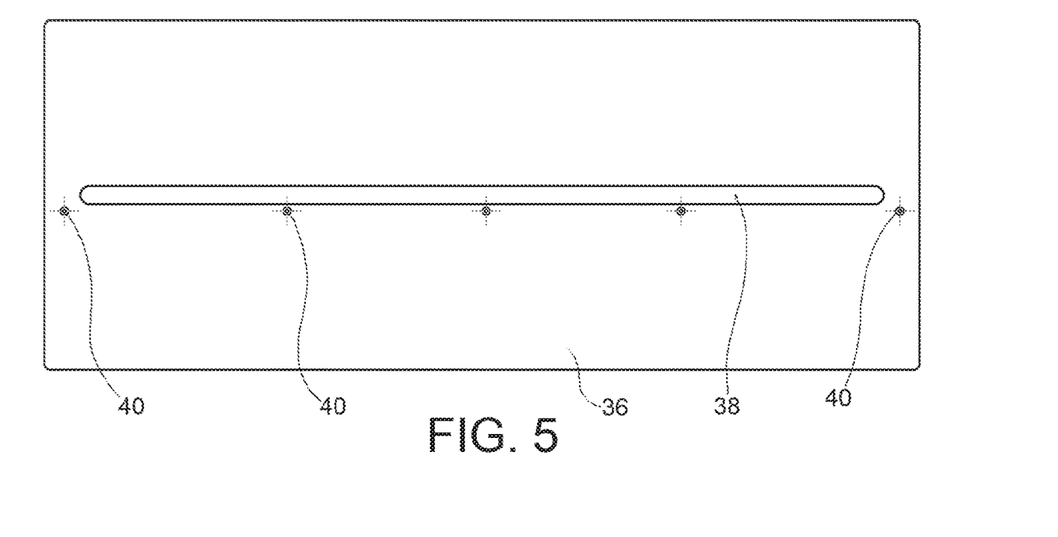

To this end, the dropper machine comprises a cam device, indicated in its entirety at 30, the features of which are further illustrated in FIGS. 3 to 5. This device comprises a plate 32 having a plurality of cams constituted by slits 34 (FIG. 3), passing through the plate, which extend according to a predetermined path, and a second plate 36 having at least one rectilinear and transverse slit 38 (FIG. 3). The plates 32 and 36 are fastened to each other by means of one or more pins 40 (FIGS. 3 and 4) that slidably engage one or more rectilinear slits 42; the plates 32 and 36 are therefore adapted to translate relative to each other in a direction orthogonal to the slit 38 by means of a drive, e.g., a motor M (FIG. 1) the activation of which is controlled by a control unit UC.

The nozzles 16 are in communication with the respective cylinder 10 by means of a flexible duct 14, which allows the variation of the interaxial distance between the nozzles. Each nozzle engages the slit 38 and a respective slit 34 and is vertically bound to the same. The translation of one plate with respect to the other, in the horizontal plane, in the direction of the arrow F (FIG. 3), i.e. in a direction orthogonal to the extension of the slit 38, therefore, causes a corresponding translation of the nozzles 16, bound to follow the path of a respective slit 34, causing a change in the interaxial distance between the nozzles in the transverse direction and therefore the change of their delivery point with respect to the receptacles R, as a function of the path of the slits 34.

Figure 6:
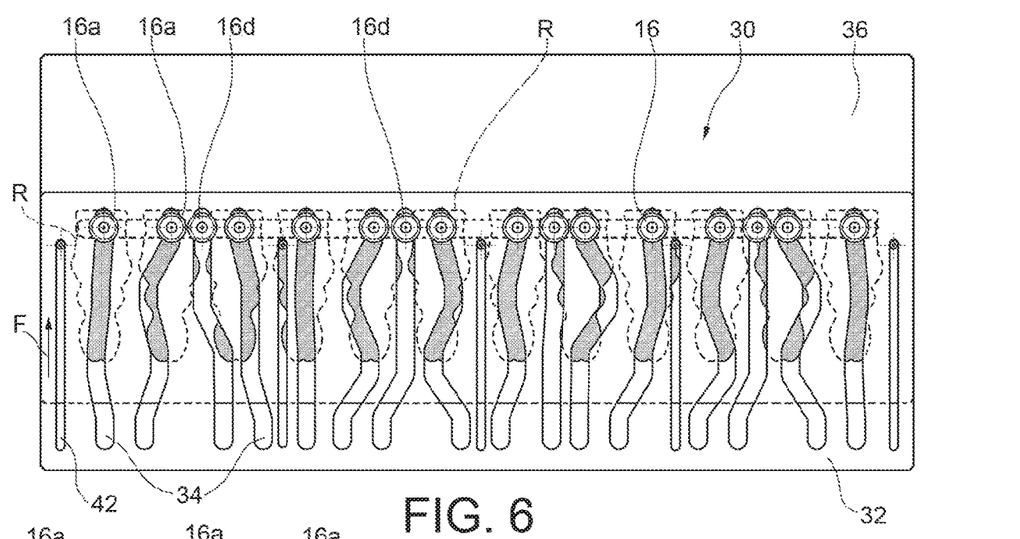
FIG. 6 is a plan view of the cam device in FIG. 3 in its operative position.
Figure 8:
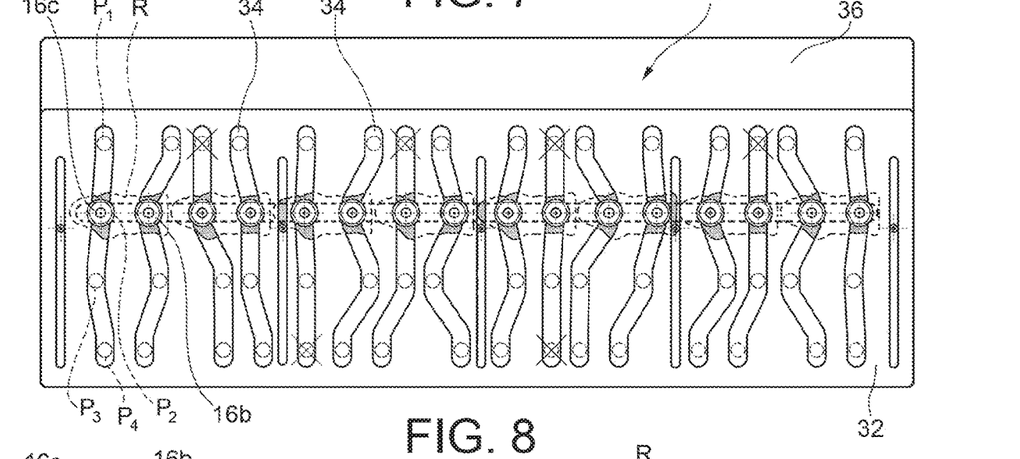
FIG. 8 is a plan view of the cam device in FIG. 3 in another operating position.

FIG. 6 illustrates an operative position of the cam device wherein the position of the nozzles 16 is visible with respect to the receptacles R which are illustrated with a dotted line as they are fed by the dropper machine in the position underlying the cam device, possibly housed in the cavities of a dimpled plate P (see FIG. 1). In FIG. 6, the nozzles 16 are arranged at one end of the respective slit 34. The translation of the plate 32 in the direction and way of the arrow F (or vice versa of the plate 36 in the opposite direction) results in a change in the distance between the nozzles 16 as a function of the path of the slits 34. It is possible to provide that the plate 32 (or the plate 36) may be moved by the motor M to any position along the course of the slits 34 or alternatively, that the motor M makes possible a predetermined number of relative positions; FIG. 8 shows, for example, with reference to each nozzle 16, four positions, P1, P2, P3, and P4, represented with a dotted circle along the course of a slit 34.

The course of the slits 34 is predetermined as a function of the arrangement of the desired dropping points in relation to the receptacles R. For example, in the position illustrated in FIG. 8, two nozzles 16c and 16b are provided to carry out the delivery of the substance to be dropped into a single receptacle R.

Figure 7:
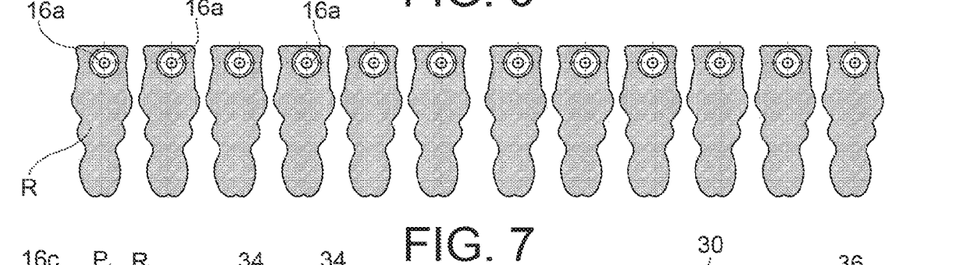
FIG. 7 is a schematic plan view showing the position of the active metering nozzles with respect to the receptacles in the operative position of FIG. 6.

One may appreciate the fact that the dropper machine according to the invention allows the operator to vary the delivery configuration as a function of the arrangement and nature of the receptacles fed to the dropper machine by using the cam device 30 in combination with the activation or deactivation of the metering devices 8 generated by actuators 24. Thus, in order to obtain a predetermined configuration of the arrangement of the nozzles, it is possible to operate the cam device 30 and jointly proceed with the activation/deactivation of one or more metering devices. This possibility is illustrated, for example, in FIG. 6 where 16a indicates nozzles of which the metering device is activated and 16d indicates nozzles of which the metering device is deactivated; the corresponding delivery configuration is illustrated in FIG. 7 wherein is shown the arrangement of the receptacles R, to which an active nozzle 16a corresponds.

Figure 9:
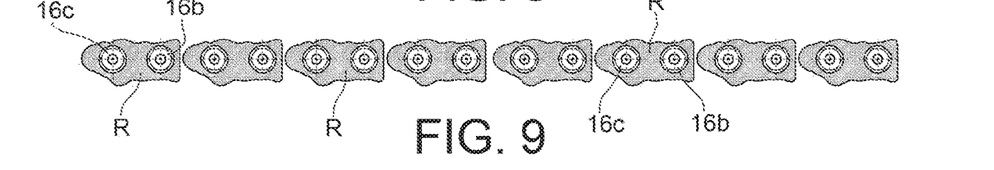
FIG. 9 is a plan view showing the position of the active nozzles with respect to the receptacles wherein the dropping is carried out, in the operative position of FIG. 8.

Similarly, FIG. 9 illustrates the arrangement of the receptacles R wherein the nozzles 16c and 16b, both active, deliver the substance to be metered; in this case, two nozzles deliver the substance into a single receptacle.

Figure 2:
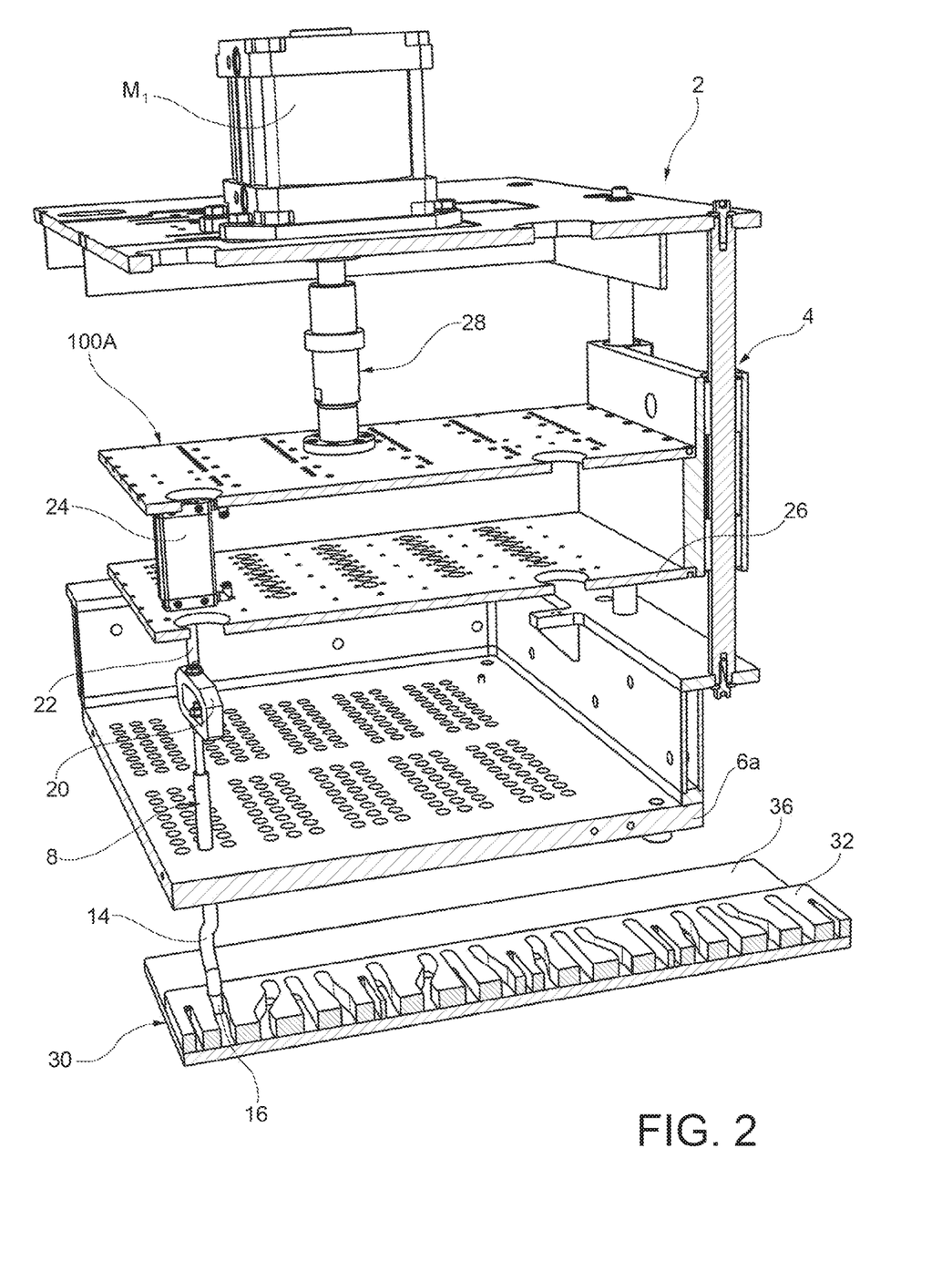
FIG. 2 is a perspective view of a dropper machine according to FIG. 1, wherein, for illustrative simplicity, only a few construction parts are illustrated.

FIG. 2 is a perspective view illustrating a portion of the dropper machine of FIG. 1 showing a single measuring device 8 of which the nozzle engages the cam device 32; in FIG. 2, elements corresponding to the elements illustrated in FIG. 1 are indicated with the same reference number.

A first advantage of the dropper machine according to the invention lies in the possibility of avoiding waste of the fluid substance to be metered by inhibiting the delivery when one or more of the receptacles R is defective and therefore unfit to receive the fluid substance.

Another advantage consists in the possibility of varying the configuration of the delivery when the dropper machine is used in the same production line to pour the substance into receptacles R of various kinds and dimensions that are fed to the dropper machine on support plates with different dimensional and spatial configurations, thus requiring a variation in the arrangement of the nozzles.

Figure 10:
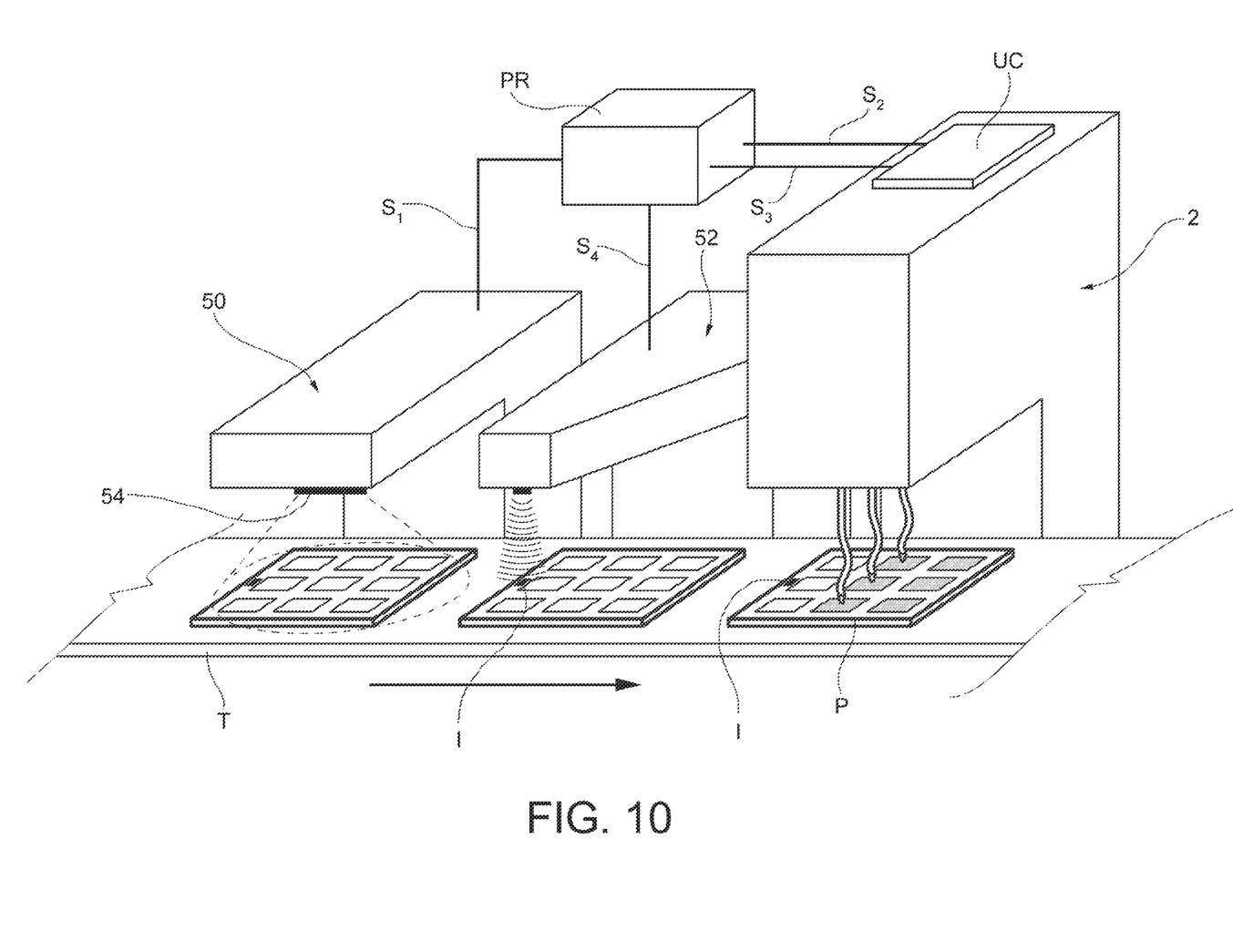
FIG. 10 is a schematic representation of a portion of a production line including the dropper machine that is object of the invention.

To this end, the dropper machine or the production line wherein the dropper machine is inserted may comprise, upstream from the dropper machine or at its inlet, a read device 50 or 52 (FIG. 10) arranged to generate a signal that allows:

i) identification of any receptacles which are defective or non-compliant with production specifications,
ii) determination of the location of said defective receptacles, in the support plate wherein they are housed, and/or
iii) determination of the parameters relating to the receptacles into which the fluid substance is to be delivered and their arrangement on the support plate, i.e. the parameters on which the spatial configuration of the dropper nozzles depends in relation to the product that one wishes to obtain.

In one embodiment, said aforementioned read device may be a sensor or preferably a display and/or image recording device comprising, for example, a camcorder 54. Such read device is arranged to generate a signal S1 that may be processed by a computer device, such as a processor PR (FIG. 10), which in turn sends the control unit UC associated with the dropper machine a signal S2 identifying the parameters referred to in points i), ii) and/or iii). It is understood that for the identification of defective receptacles, the processor PR can perform such operation by comparing the signal S1 with predetermined and saved reference data concerning non-defective receptacles.

Alternatively, or at the same time, the read device may be an electronic unit 52 arranged to receive an identifying signal of the parameters and characteristics of the receptacles wherein the fluid substance must be metered and of their placement on the related support plate P, to which corresponds a predetermined spatial configuration of the nozzles.

In this embodiment, each support plate P has an identifying device indicated at I in FIG. 10. Such device may be, for example, a so-called RFID, including integrated electronic memory devices wherein information or data are readable and writable, without contact, by means of an associated antenna or the like. In such memory devices of the identification device I are stored distinctive information or data on the nature of the support plate P, the related arrangement of the supporting cells, the receptacles and/or the nature of the receptacles themselves. In other embodiments, the identification device I may be a barcode or a QR code.

The S4 read signal of the identification device, possibly processed by the processor PR to generate a signal S3, is then fed to the control unit UC of the dropper machine. It is understood that the electronic unit 52 and its related processor may constitute part of the dropper machine 2.

According to the aforementioned signals (S2 and/or S3), the control unit UC is arranged to:
generate an individual activation signal for the individual actuators 24, independently from each other, to bring the delivery device 8 associated to them into the activation and/or deactivation position when the read device detects the presence of a receptacle that does not conform to the specifications and/or when it detects the feeding of receptacles to the dropper machine that require a different dropping configuration;
generate an activation signal of the motor M associated with the cam device 30 to vary the interaxial distance between the nozzles 16 and consequently the delivery configuration when conditions corresponding or analogous to the aforesaid conditions occur;
actuate the pistons 28 via the motor M1 and/or M2 to determine the suction and compression cycle and subsequent delivery by all the metering devices 8 associated with the same drive unit.

By these features, the invention provides a highly flexible and selective dropper machine, allowing a wide variety of delivery configurations without the need to stop the production cycle.

With this, the flexibility of production may be greatly increased.

Naturally, without altering the principle of the invention, the embodiments and the details of the embodiment may vary widely with respect to those described and illustrated purely by way of non-limiting example, without thereby departing from the scope of the invention as defined in the following appended claims.

What is claimed is:

1. A dropper machine for dropping a metered amount of a substance in a plurality of receptacles, comprising:
a support structure,
a reservoir containing the substance to be dropped, supported by said structure,
a plurality of cylinder and piston metering devices with an inlet positioned below the level of the substance to be poured into the reservoir and an outlet communicating with a respective dropper nozzle,
at least one drive unit arranged to simultaneously drive a piston of each respective metering device according to a forward and backward motion between a start position and an end position where displacement of the pistons from the end position to the start position causes suction of the substance to be dropped from the reservoir to the cylinder of the metering devices and displacement of the pistons from the start position to the end position is adapted to cause delivery of the substance to be dropped through the respective nozzles, wherein to each of said metering devices is associated a respective actuator device cooperating with the piston of said metering device, said actuator device being operable individually to inhibit delivery of the substance to be dropped through said nozzle when the drive unit is actuated to cause displacement of the pistons of the metering devices associated therewith between the start position and the end position,
at least one read device adapted to generate a signal which allows:
i) the identification of any defective receptacles or receptacles not conforming to the production specifications,
ii) the determination of the location of the aforementioned defective receptacles, in the support plate wherein they are housed, and/or
iii) the determination of the parameters relating to the receptacles wherein the substance is to be dropped and/or to their arrangement in the support plate, on which the spatial configuration of the dropper nozzles depends in relation to the product that a user wishes to obtain, and
a control unit arranged to generate an activation signal of a cam actuator device associated with a cam device to vary an interaxial distance between the nozzles and consequently the delivery configuration when said read device detects the feeding to the dropper machine of receptacles that require a different dropping configuration.

2. A dropper machine according to claim 1, wherein each of said actuator device is electrically connected to the control unit, enabling said cam actuator device to be individually activated or deactivated.

3. A dropper machine according to claim 2, wherein said actuator device comprises a rod connected to the piston of the metering device, said rod being axially movable between a first and a second position corresponding to activation and deactivation positions of delivery of the substance.

4. A dropper machine according to claim 1, wherein each of said nozzles is connected to the cylinder of the respective metering device by means of a hose which allows the interaxial distance between the nozzles to be varied and wherein said nozzles engage cams of said cam device that is operable in a plurality of operative positions to cause the variation of the interaxial distance between the nozzles.

5. A dropper machine according to claim 4, wherein said cam device comprises a first and second superimposed plate, slidably connected to each other, where said second plate has a rectilinear slit extending in a direction orthogonal to a sliding direction and the first plate has a plurality of slits extending according to a predetermined path in a direction parallel to the sliding direction, where each of said nozzles extends through said rectilinear slit and through a respective slit of said plurality of slits of the first plate, being vertically bound thereto, whereby sliding of one of the first and second plate with respect to the other of the first and second plate causes the interaxial distance between the nozzles to vary.

6. A dropper machine according to claim 5, wherein said cam device is actuated by means of said cam actuator device, which allows the positioning of said first and second plate relative to each other in a plurality of operative positions.

7. The dropper machine according to claim 1, wherein said read device is a display and/or image recording device.

8. A dropper machine according to claim 1, wherein said read device comprises an electronic unit arranged to receive a signal identifying the parameters and features of the receptacles wherein the fluid substance is to be metered and of their location in the related support plate.

9. A dropper machine according to claim 8, wherein each support plate comprises an associated identification device selected from the group consisting of an RFID, a bar code and a QR code.

10. A dropper machine according to claim 9, wherein said identification device is an RFID including integrated memory devices in which information or data are readable and/or writeable, without contact, by means of an associated antenna.

* * * * *